(12) United States Patent
Robinson et al.

(10) Patent No.: US 8,683,936 B1
(45) Date of Patent: Apr. 1, 2014

(54) POWERBOAT ROOSTER TAIL DEPRESSOR

(75) Inventors: Charles W. Robinson, Santa Fe, NM (US); William F. Burns, III, San Diego, CA (US)

(73) Assignee: M Ship Co., LLC., San Diego, CA (US)

( * ) Notice: Subject to any disclaimer, the term of this patent is extended or adjusted under 35 U.S.C. 154(b) by 51 days.

(21) Appl. No.: 13/541,637

(22) Filed: Jul. 3, 2012

Related U.S. Application Data

(63) Continuation-in-part of application No. 12/802,426, filed on Jun. 7, 2010, now abandoned.

(60) Provisional application No. 61/271,380, filed on Jul. 20, 2009.

(51) Int. Cl.
*B63B 1/00* (2006.01)

(52) U.S. Cl.
USPC .............................. 114/271; 114/285; 440/66

(58) Field of Classification Search
USPC ................. 114/271, 274, 284, 285, 286, 291; 440/51, 66, 67, 69, 71
See application file for complete search history.

(56) References Cited

U.S. PATENT DOCUMENTS

| | | | | |
|---|---|---|---|---|
| 4,443,202 A | * | 4/1984 | Arena | 440/51 |
| 4,553,945 A | * | 11/1985 | Foster | 440/51 |
| 5,673,643 A | * | 10/1997 | Poppa | 440/66 |

\* cited by examiner

*Primary Examiner* — Lars A Olson
(74) *Attorney, Agent, or Firm* — Loyal McKinley Hanson

(57) ABSTRACT

A powerboat with a rooster tail depressor (RTD) includes a hull, a propulsion subassembly on the hull, and a rooster-tail-suppressing canopy on the stern that includes a downwardly facing surface no less than six inches above the dynamic water line of the stern where it functions to suppress the powerboat rooster tail for radar signature reduction and increased propulsion efficiency. Various embodiments include one or more of (i) a canopy having a downwardly facing surface that is arched (either curved or faceted), (ii) lift-to-drag ratio enhancing steps in the downwardly facing surface of the canopy, (iii) a rooster-tail-suppressing subassembly configured to enable articulation of the canopy in yaw and in trim, and (iv) operator-controlled port and starboard venting arrangements on the canopy that result in desired laterally directed thrust for enhanced maneuverability.

5 Claims, 11 Drawing Sheets

POWERBOAT ROOSTER TAIL DEPRESSOR

CROSS REFERENCE TO RELATED APPLICATION

This application is a continuation in part of copending and commonly assigned U.S. patent application Ser. No. 12/802,426 filed Jun. 7, 2010 (the parent application), which parent application claims the benefit of U.S. Provisional Patent Application Ser. No. 61/271,380 filed Jul. 20, 2009.

BACKGROUND OF THE INVENTION

1. Technical Field

This invention relates generally to the field of powered watercraft, and more particularly to powerboats, seagoing vessels, and the like that tend to produce a rooster tail when moving forwardly.

2. Description of Related Art

When the hull of a powerboat is driven forward, whether by propellers, water jets, or some other propulsion subassembly on the vessel, the propulsion subassembly often produces what can be called a propulsion discharge. As the hull is propelled forwardly by a powerful propulsion system, the propulsion discharge (i.e., water) can be forced vertically into the air rearward of the powerboat's stern as a result of the power and various hydrodynamic factors involved. The resulting plume of water behind the powerboat is commonly referred to as a "rooster tail" or "powerboat rooster tail" because it reminds one of the tail of a rooster. Such a rooster tail increases in size with vessel speed and can become quite large.

One problem with a powerboat rooster tail is that it can expose a military vessel to the enemy. The rooster tail can create a noticeable radar signature that is useable by enemy fire control for acquiring, tracking, and attacking the vessel. Another problem relates to powerboat efficiency in that a large amount of energy is expended in creating the rooster tail. Thus, powerboat manufacturers and users need a way to alleviate the above drawbacks.

SUMMARY OF THE INVENTION

It is a primary object of the present invention to alleviate the foregoing concerns. The present invention does so by providing what may be called a "rooster tail depressor" (RTD). It is a rooster-tail-suppressing assembly on the hull that takes the form of a structure (e.g., a canopy) extending rearwardly of the stern and over the powerboat's rooster-tail-producing propulsion discharge. The RTD suppresses the propulsion discharge and thereby the powerboat rooster tail in a way that reduces the rooster-tail radar signature while increasing powerboat efficiency and performance.

To paraphrase some of the more precise language appearing in the claims and further introduce the nomenclature used, a powerboat constructed according to the invention includes a hull having a stern, a propulsion subassembly, and a rooster-tail-suppressing structure on the hull. The propulsion subassembly functions as means for propelling the hull forwardly, producing a propulsion discharge at the stern as it does so. The rooster-tail-suppressing subassembly (i.e., the RTD) includes a structure on the hull that extends rearwardly of the stern and over at least a portion of the propulsion discharge, where it functions as means for suppressing the formation by the propulsion discharge of the powerboat rooster tail. The RTD includes a downwardly facing surface that extends rearwardly from the stern with an upper portion disposed no less than six inches above the dynamic water line of the stern, so that the downwardly facing surface is in a position to divert the rooster tail back downwardly after the rooster tail develops.

So configured, the RTD recaptures a large amount of energy in the powerboat rooster tail that is otherwise lost. Recapturing that energy produces a significant gain in vessel lift, thereby reducing friction drag for a planing craft with an increase in propulsion efficiency. The RTD traps the vertical component of the propulsion discharge for vessel lift, while merely redirecting the rearwardly directed horizontal component downwardly without braking the vessel and thereby reducing its forward velocity.

In one preferred embodiment of the invention, the rooster-tail-suppressing subassembly includes a canopy having a downwardly directed surface extending over at least a portion of the propulsion discharge. The downwardly facing surface is arched (laterally and/or longitudinally) and it may be faceted and/or curved. Steps in the downwardly facing surface of the canopy enhance lift-to-drag ratio. Another aspect concerns a rooster-tail-suppressing subassembly that can be removed from the transom or folded back into the hull to reduce overall length of the powerboat for storage or transport. Yet another aspect concerns articulation of the rooster-tail-suppressing subassembly in yaw and/or in trim.

Still another maneuverability-enhancing aspect concerns an RTD having a canopy with port and starboard sides that restrict lateral movement of the powerboat rooster tail, but which can be individually vented under operator control to produce a net laterally directed thrust (sideways force on the stern) as a turning moment. In that regard, a rudder can act as a brake; it is used for slow speed; it brakes and reduces performance. The vent-able RTD canopy, however, supplements the rudder, using the lateral thrust of the powerboat rooster tail to create a turning moment. Unlike prior art trim tabs that restrict powerboat rooster tail formation, the RTD canopy allows the powerboat rooster tail to form above the dynamic waterline of the stern while using it for vertical lift that improves efficiency and lateral thrust that improves maneuverability. The sides of the RTD canopy slide, pivot, or are adjustable vents (e.g., louvered with adjustable shutters) to create an imbalance in lateral thrust for a resultant turning moment.

Thus, the invention, in all its forms, provides a powerboat with a rooster-tail-suppressing RTD that significantly reduces powerboat radar signature while improving powerboat efficiency and performance. The following illustrative drawings and detailed description make the foregoing and other objects, features, and advantages of the invention more apparent.

BRIEF DESCRIPTION OF THE DRAWINGS

FIG. 10 is a diagrammatic perspective view of a non-vented RTD canopy;

FIG. 11 is a diagrammatic elevation view of the non-vented RTD canopy as viewed from a position rearward of the RTD;

FIG. 12 is a diagrammatic perspective view of a first vented RTD canopy having vertically movable port and starboard side panels, with the starboard panel shown raised to a VENTED position;

FIG. 13 is a diagrammatic elevation view of the first vented RTD canopy with the starboard panel raised, showing the direction of powerboat rooster tail travel as it is vented toward starboard to produce a resulting port-directed turning moment;

FIG. 14 is a diagrammatic perspective view of a second vented RTD canopy having pivotable port and starboard side panels, showing the starboard panel pivoted to a vented position that vents the powerboat rooster tail toward starboard for a port-direct turning moment;

FIG. 15 is a diagrammatic perspective view of a third vented RTD canopy having port and starboard side panels with shutters, showing the starboard shutters in a VENTED position that vents the powerboat rooster tail toward starboard for a port-directed turning moment;

DESCRIPTION OF THE PREFERRED EMBODIMENTS

Figure 1:
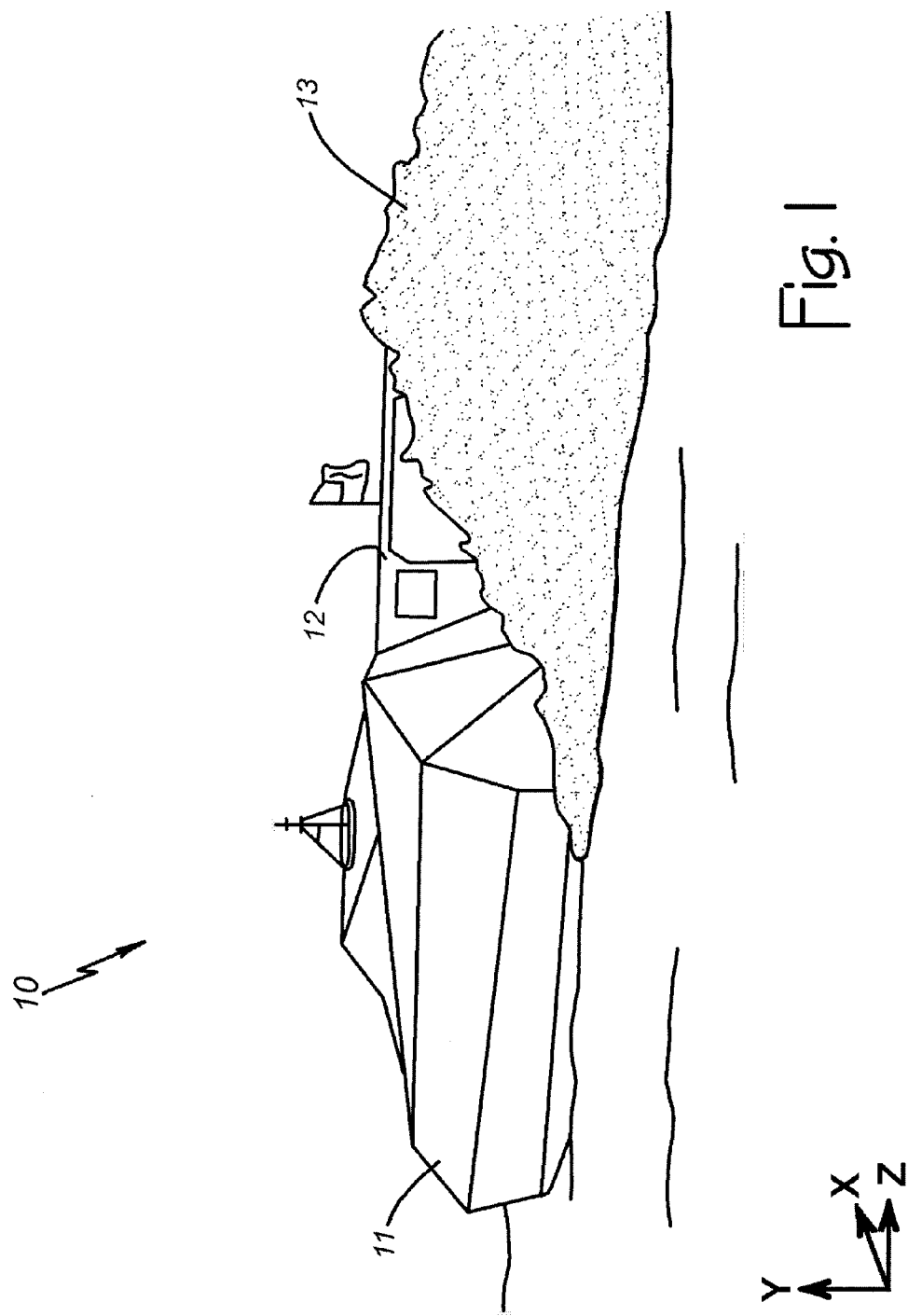
FIG. 1 of the drawings is a pictorial view of a powerboat constructed according to the prior art that is shown being propelled forwardly as it produces a rooster tail extending rearwardly, with an X-Y-Z Cartesian coordinate system included for spatial reference purposes.

FIG. 1 of the drawings shows a powerboat 10 constructed according to the prior art. The illustrated prior art powerboat 10 takes the form of a military vessel having a M-shaped hull 11 with a stern 12. As a propulsion assembly onboard the hull 11 (not shown) propels the hull 11 forwardly, the propulsion discharge it produces (i.e., water) forms a rooster tail 13. The rooster tail 13 has a radar signature that an enemy can detect. In addition, production of the rooster tail 13 consumes energy and thereby decreases vessel efficiency.

Figure 2:
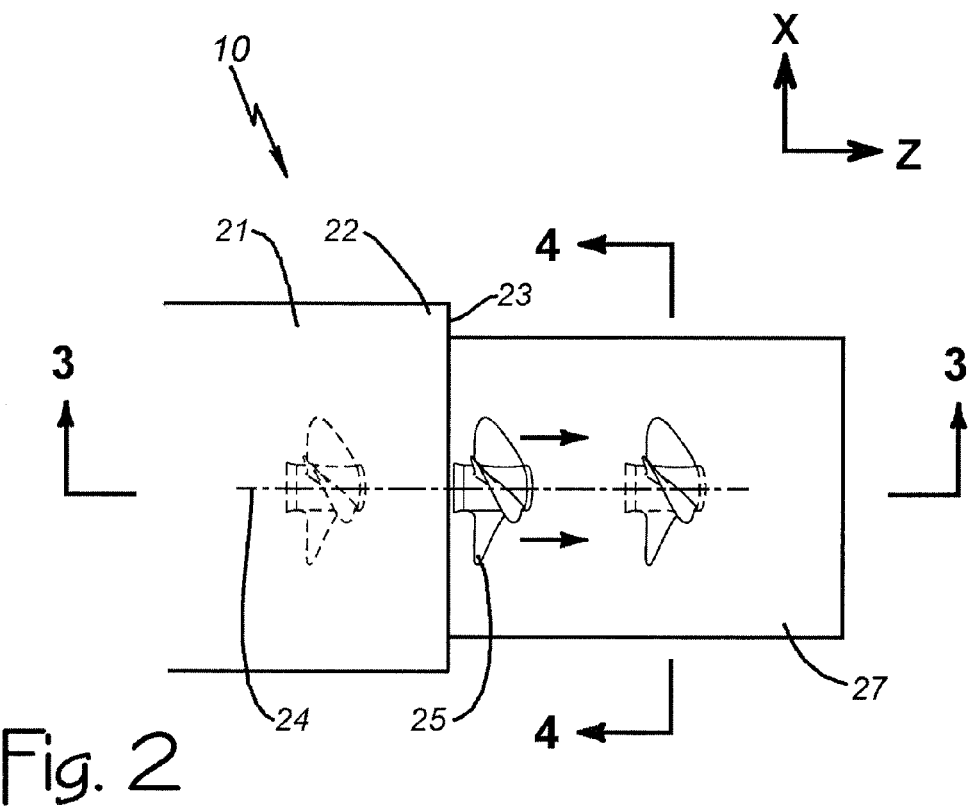
FIG. 2 of the drawings is a diagrammatic plan view of a powerboat having a first embodiment of a rooster-tail-depressing RTD constructed according to the invention, as viewed from overhead looking downwardly along a line of sight perpendicular to the X-Z plane of the Cartesian coordinate system.
Figure 3:
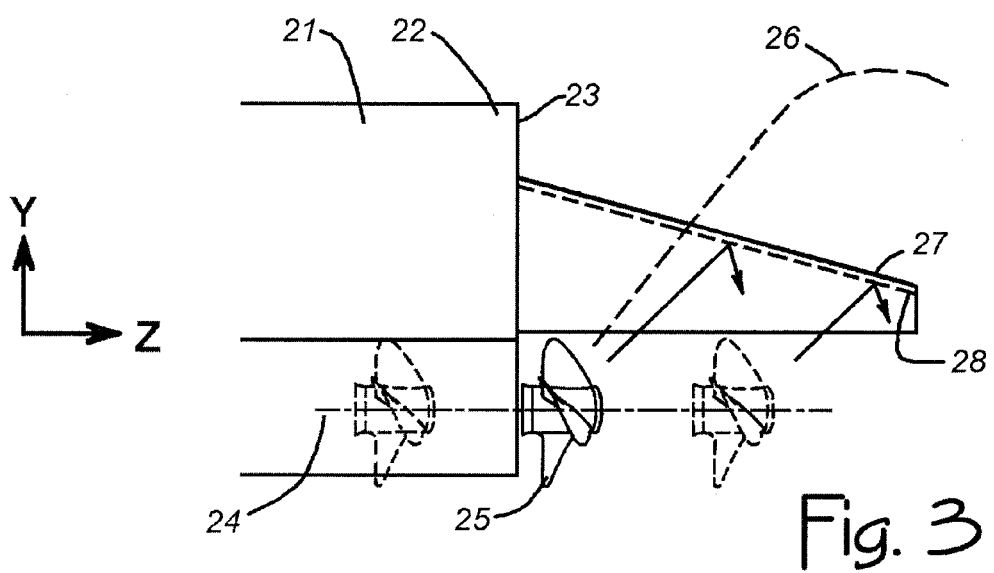
FIG. 3 of the drawings is a diagrammatic cross sectional view of the powerboat and the first RTD embodiment as viewed in a vertical plane containing a longitudinally extending line 3-3 in FIG. 2 that is perpendicular to the X-Y plane of the Cartesian coordinate system.

FIG. 2 of the drawings is a diagrammatic plan view of a powerboat 20 constructed according to the present invention. The powerboat 20 includes a hull 21 having a stern 22 with a transom 23. The powerboat 20 also includes a propulsion subassembly on the hull 21 that produces a propulsion discharge. The propulsion subassembly is not fully illustrated, but it may include known types and kinds of propellers and/or jets that are centered on a longitudinally extending hull axis 24 of the powerboat 20 extending parallel to the Z axis as shown in FIGS. 2 and 3. The propulsion subassembly is depicted diagrammatically by a propeller 25 in FIG. 2. Various propeller positions relative to the transom 23 are shown, including a water-jet propeller position furthest rearwardly of the transom 23 (i.e., toward the right margin of the drawing sheet on which FIG. 2 appears, in the direction indicated by an arrow on the Z axis of the Cartesian coordinate system).

The propulsion subassembly functions as means for propelling the hull 21 forwardly. In operation, the propeller 25 produces a rearwardly directed propulsion discharge (i.e., water) that propels the hull 11 forwardly (in a direction opposite the direction indicated by the arrow of the Z axis). The propulsion discharge is depicted diagrammatically in FIG. 1 by two rearwardly directed arrows near the propeller 25; it tends to form a rooster tail extending upwardly and rearwardly from the stern 22, as mentioned above with reference to FIG. 1 and as depicted diagrammatically in FIG. 3 by a broken line 26 shown extending upwardly and rearwardly from the propeller 25.

According to the major aspect of the invention, the powerboat 20 has a rooster tail depressor (i.e., an RTD) in the form of a rooster-tail-depressing subassembly extending rearwardly of the stern 22. The RTD functions as means for suppressing the formation by the propulsion discharge of the powerboat rooster tail (the broken line 26 in FIG. 3). A first RTD embodiment shown diagrammatically in FIGS. 2 and 3 includes a canopy 27 that extends rearwardly of the stern and over at least a portion of the propulsion discharge. The canopy 27 includes a downwardly facing surface 28 that deflects the propulsion discharge (i.e., the source of the rooster tail) downwardly as depicted diagrammatically by the two redirected arrows beneath the surface 28 in FIG. 3. The width of the canopy 27 parallel to the X axis, the length parallel to the Z axis, and the outline are all functions of the vessel size and speed in addition to being a function of propeller size, location, and function.

Figure 4A:
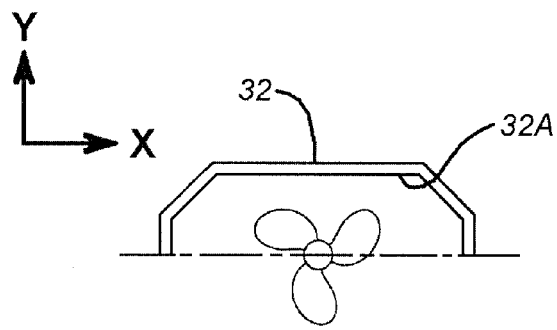
FIG. 4a of the drawings is a diagrammatic cross sectional view of a faceted second RTD embodiment as viewed in a vertical plane containing a transversely extending line 4-4 in FIG. 2 that is perpendicular to the Y-Z plane of the Cartesian coordinate system.

FIG. 4a is a diagrammatic elevation view of a canopy 32 on a second embodiment of the invention. The canopy 32 is faceted in the sense that it includes a downwardly facing surface 32A having a cross sectional shape in a vertical transverse plane parallel to the X-Y axis that is not continuously curved; it includes multiple line segments or chords instead.

Figure 4B:
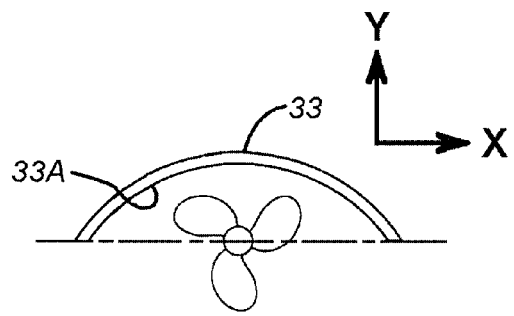
FIG. 4b of the drawings is a diagrammatic cross sectional view of a curved third RTD embodiment as viewed in a vertical plane containing the transversely extending line 4-4 in FIG. 2.

FIG. 4b is a diagrammatic elevation view of a canopy 33 on a third embodiment of the invention. The canopy 33 is curved in the sense that it includes a downwardly facing surface 33A having a cross sectional shape in a vertical transverse plane parallel to the X-Y axis that is continuously curved. The shapes of the canopy 32 and the canopy 33 are functions of the propeller size, number, and location. Other considerations affecting their shapes include construction material and attachment design.

Figure 5:
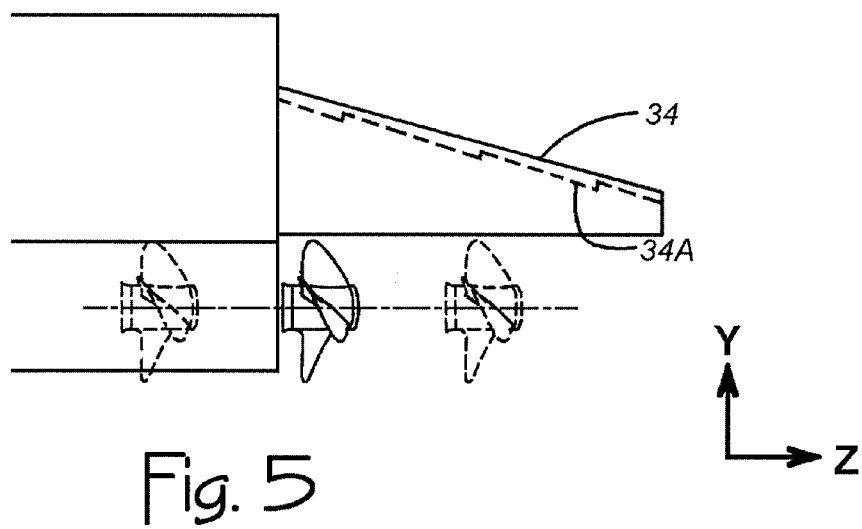
FIG. 5 is a diagrammatic elevation view (similar to FIG. 3) of a fourth RTD embodiment that includes lift-to-drag ratio enhancement steps.

FIG. 5 is a diagrammatic elevation view of a fourth embodiment of the invention having a canopy 34 with a downwardly facing surface 34A that includes lift-to-drag ratio enhancement steps. The steps are designed to promote separation of the redirected rooster tail from the RTD as soon as possible. That is done to reduce wetted surface area and viscous drag. The steps also convert any forward motion of the propeller wake into thrust.

Figure 6:
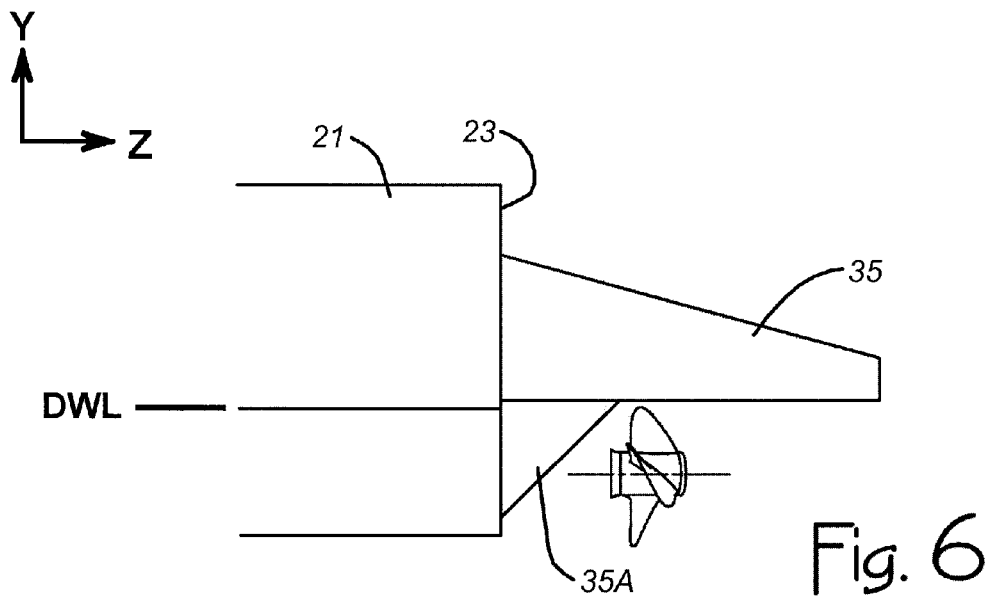
FIG. 6 is a diagrammatic elevation view of a fifth RTD embodiment that includes a thrust deflector on the transom of the vessel (i.e., a transom thrust deflector or TTD)

FIG. 6 is a diagrammatic elevation view of a fifth embodiment of the invention having a canopy 35 and an optional transom thrust deflector 35A (TTD) on the transom 23 of the hull 21.

Figure 7:
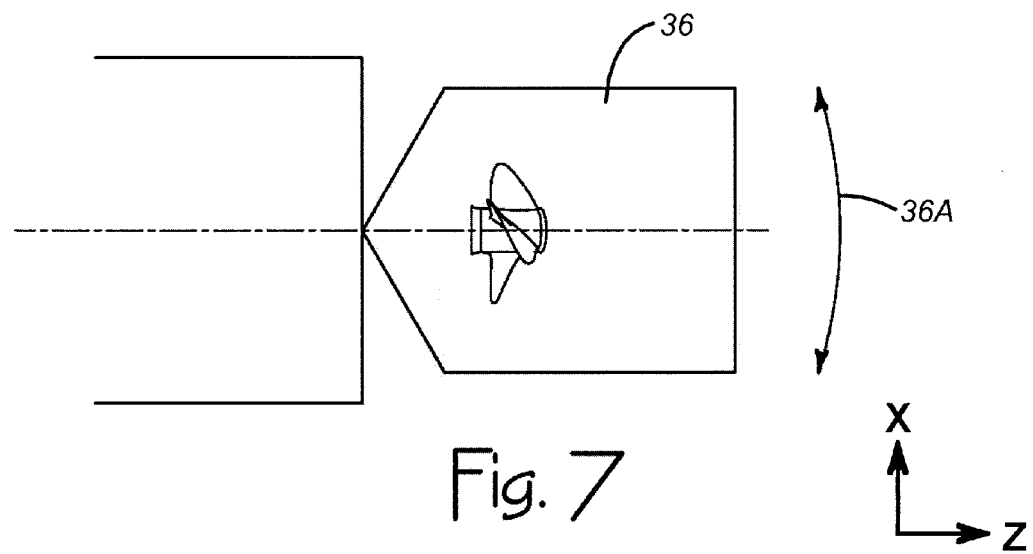
FIG. 7 is a diagrammatic plan view of a sixth RTD embodiment that can be articulated in yaw, about a pivotal axis that is perpendicular to the X-Z plane.

FIG. 7 is a diagrammatic plan view of a sixth embodiment of the invention having a canopy 36 that is configured to be articulated in yaw (about a vertical pivotal axis that is perpendicular to the X-Z plane) as depicted by an arrow 36A. The canopy 36 can be articulated in yaw to control the direction of the rooster tail, enhance control of the vessel, and/or pivot with the propeller in the case of a propeller that articulates is yaw for steering.

Figure 8:
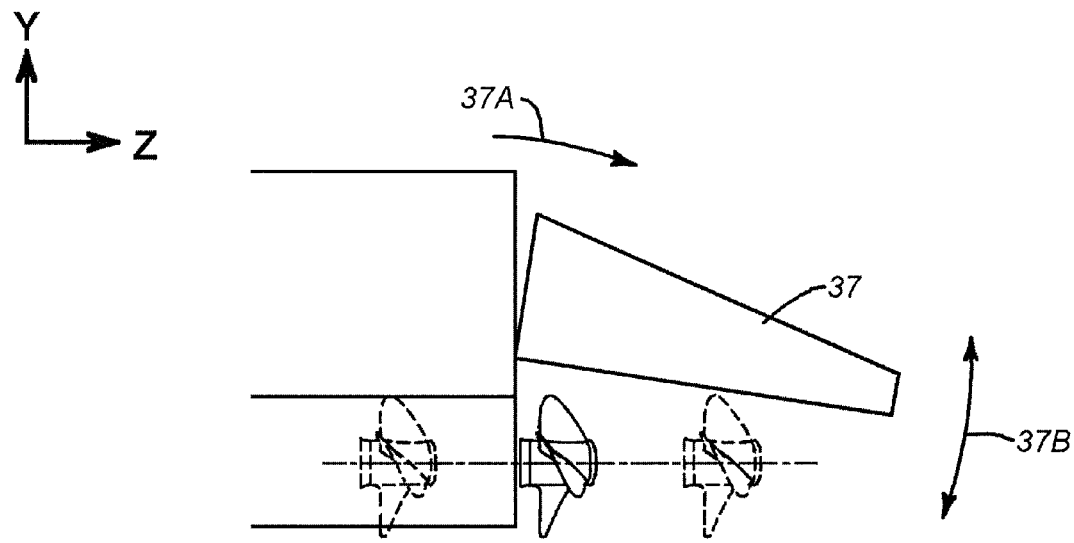
FIG. 8 is a diagrammatic elevation view of a seventh RTD embodiment that can be articulated in trim, about a pivotal axis that is perpendicular to the Y-Z plane.

FIG. 8 is a diagrammatic elevation view of a seventh embodiment of the invention having a canopy 37 that is configured to be articulated in trim (about a horizontal pivotal axis that is perpendicular to the Z-Y plane) as depicted by arrows 37A and 37B. The canopy 37 can be articulated in trim to control the amount of lift generated by capturing (i.e., depressing) the rooster tail and/or to articulate in trim with the propeller.

Figure 9:
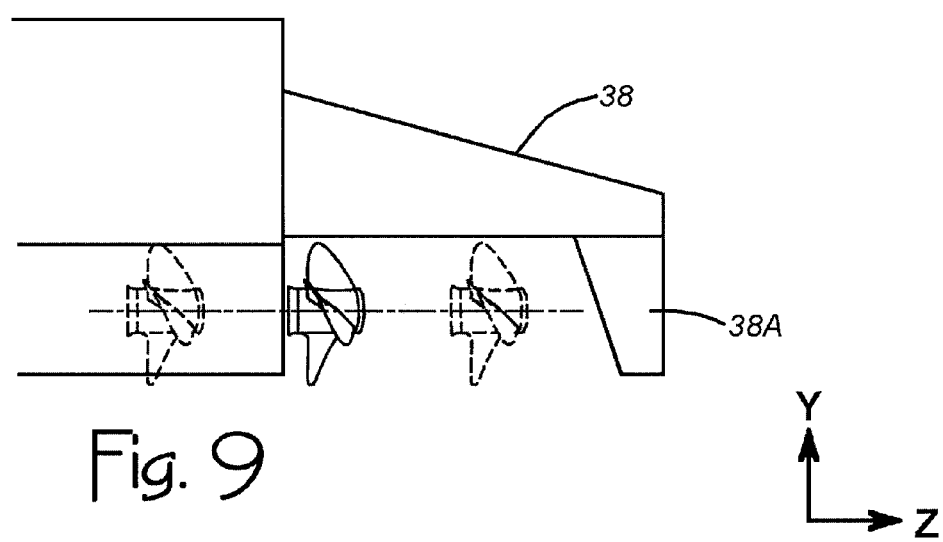
FIG. 9 is a diagrammatic elevation view of an eighth RTD embodiment that includes a skeg to enhance maneuverability and/or tracking.

FIG. 9 is a diagrammatic elevation view of an eighth embodiment of the invention having a canopy 38 with a downwardly depending skeg 38A (or "rather") attached. The skeg 38A (or "rather") enhances maneuverability of the vessel and/or improves tracking.

Figure 10:
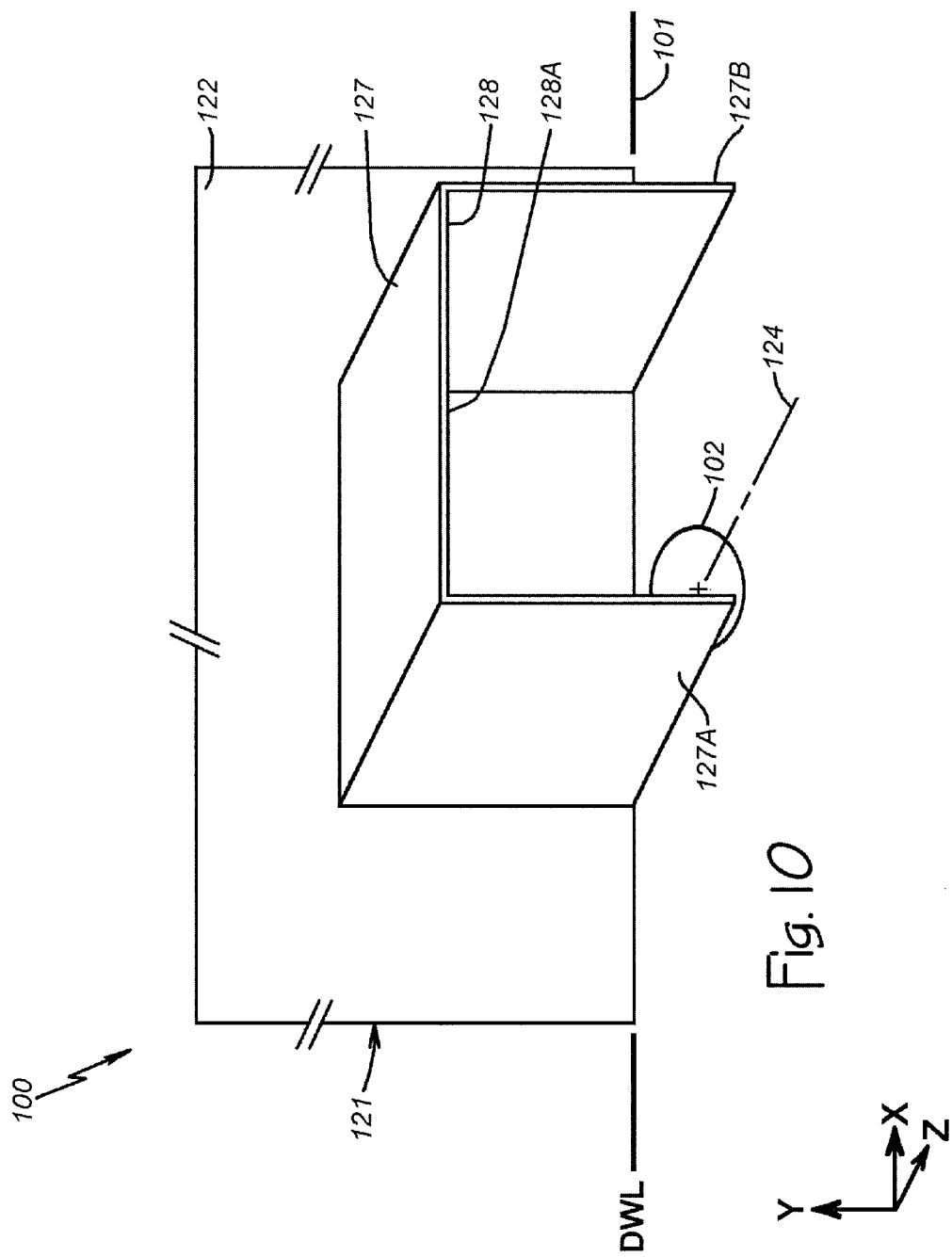
FIGS. 10-15 are diagrammatic representations of various RTD structures that help illustrate how a vented RTD canopy uses the powerboat rooster tail to produce a net lateral thrust and thereby a turning moment for enhanced maneuverability purposes.
Figure 11:
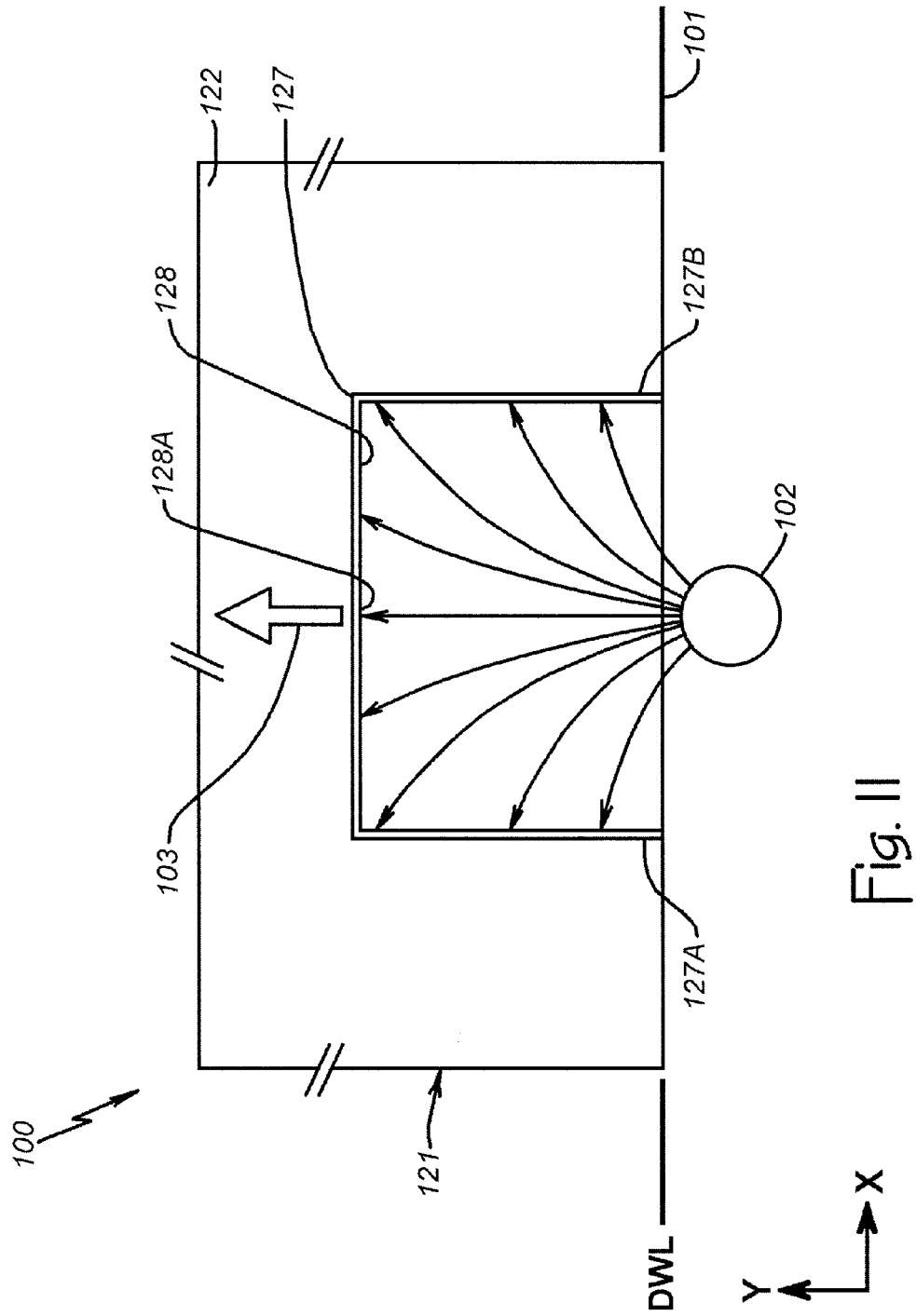

Turning now to FIGS. 10 through 15, they illustrate diagrammatically various aspects of RTD canopies that are related to the ventable-canopy aspect of the invention. FIGS. 10 and 11 concern various structural aspects of a powerboat 100 apart from the ventability feature as a basis for the discussion of FIGS. 12-15, while FIGS. 12-15 concern the ventability feature with reference to a powerboat 200, a powerboat 300, and a powerboat 400.

First, consider the powerboat 100. It is similar in many respects to the powerboat 10 described above, and so only major differences are described in further detail. For convenience, reference numerals designating parts of the powerboat 100 are increased by one hundred over the reference numbers designating corresponding, related, or similar parts of the powerboat 10. The powerboat 100 includes a hull 121 with a stern 122. The stern 122 has a dynamic water line 101 (i.e., a "DWL") representing the level on the stern 122 to which water rises when the boat hull is afloat and underway at a specified speed that results in a rooster tail). When underway, a propulsion discharge 102 centered on a longitudinal axis 124 of the hull 121 is discharged rearwardly of the stern 122 along the axis 124, producing a powerboat rooster tail.

The hull 121 includes a canopy 127 extending rearwardly of the stern 122. The canopy 103 is composed of a rigid material (e.g., a carbon fiber composite material), and it includes a downwardly facing surface 128 extending over the propulsion discharge 102 where it serves to vertically depress the rooster tail while port and starboard sides 127A and 127B of the canopy 127 that extend downwardly from the downwardly facing surface 128 limit lateral travel of the rooster tail. The downwardly facing surface 128 has an upper central region 128A that is at least six inches above the dynamic water line 101. As a result, a rooster tail can begin to develop above the DWL and yet be depressed (as depicted by the arrows in FIG. 11) to reduce a radar signature while producing lift (as depicted by a vertical force component 103 that is shown as an arrowhead in FIG. 11) for increased operating efficiency.

Figure 12:
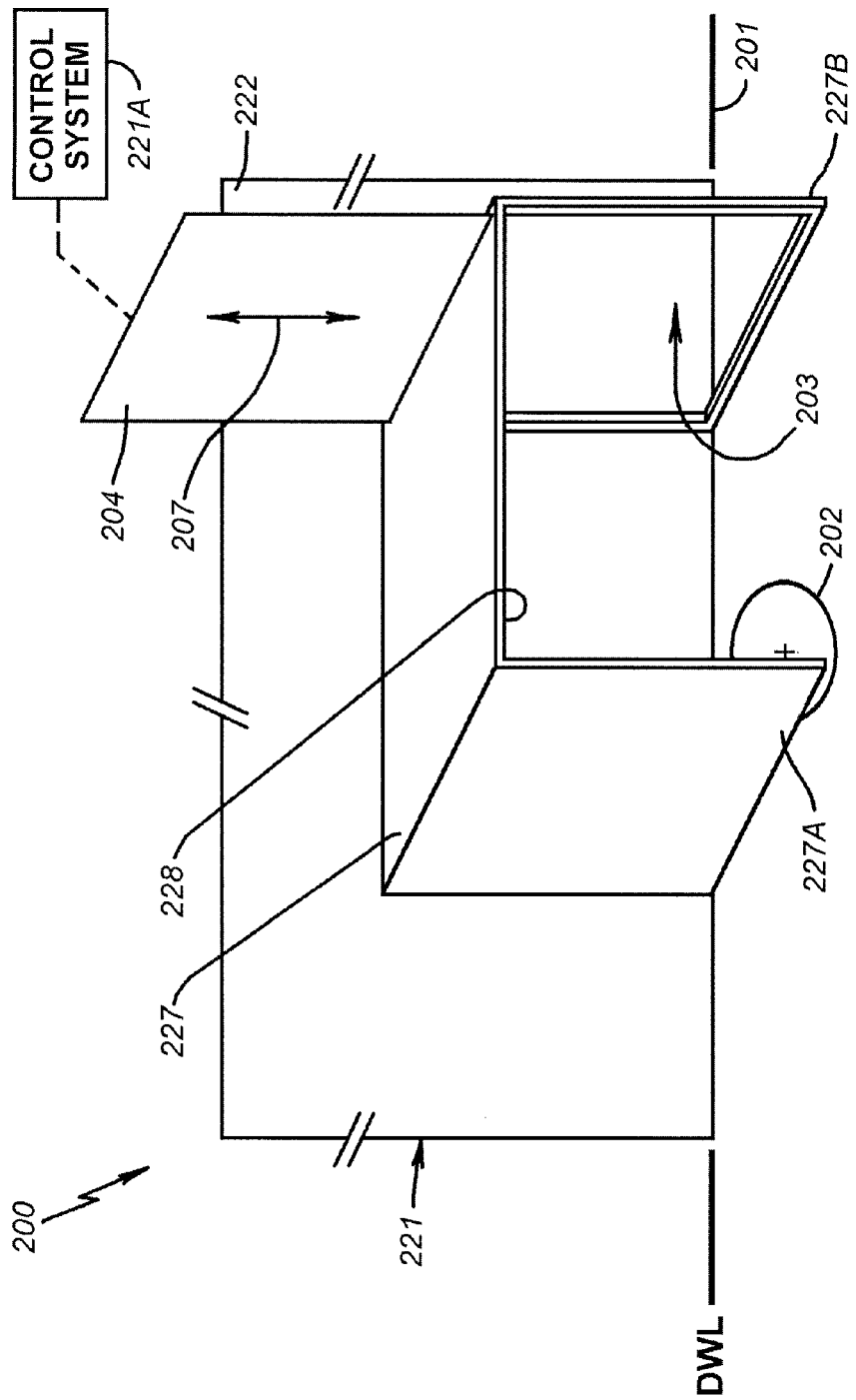
Figure 13:
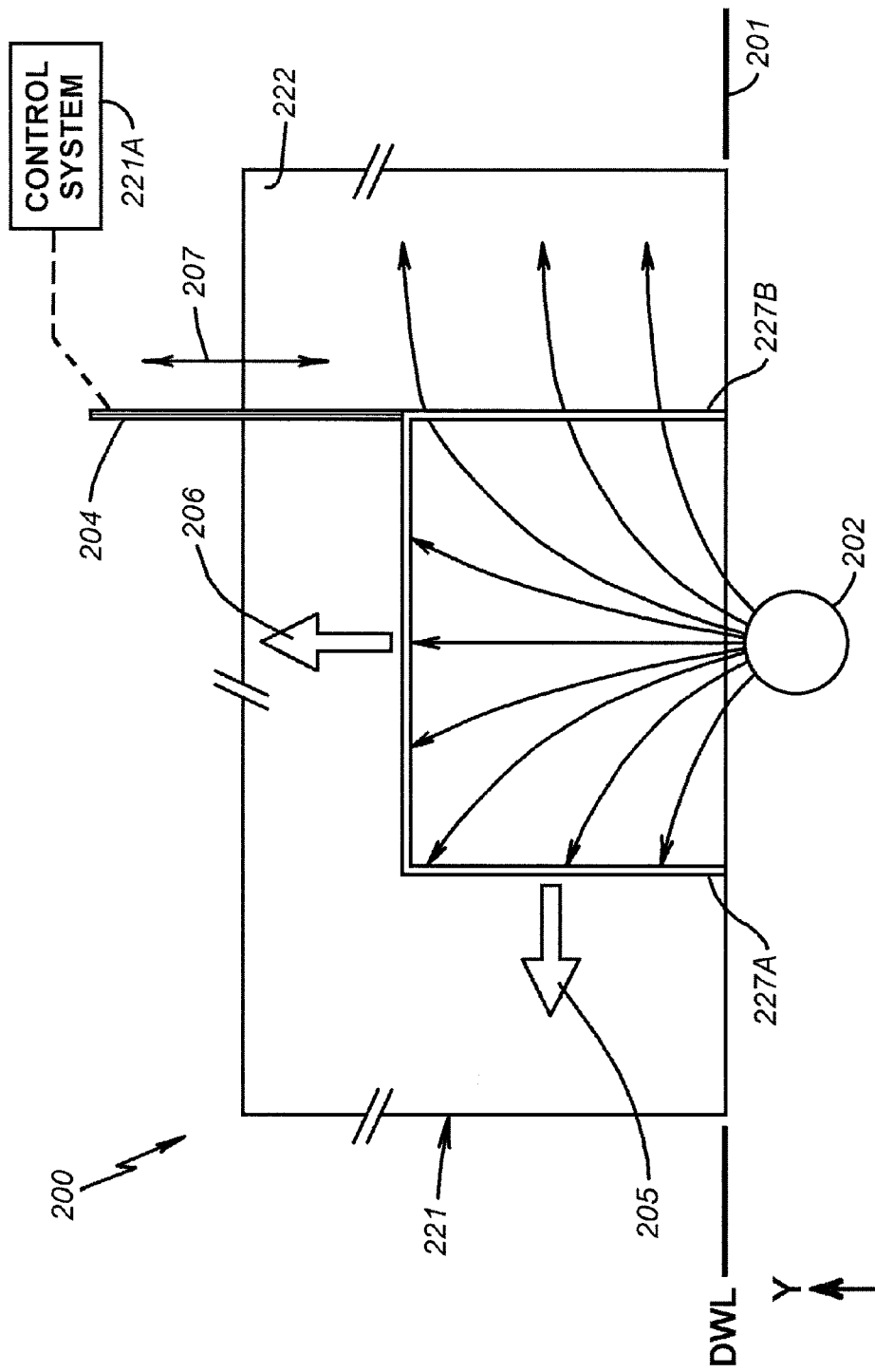

Next, consider the powerboat 200 in FIGS. 12 and 13. It is similar in many respects to the powerboat 100 described above, and so only major differences are described in further detail. For convenience, reference numerals designating parts of the powerboat 200 are increased by one hundred over the reference numbers designating corresponding, related, or similar parts of the powerboat 100.

Similar to the powerboat 100, the powerboat 200 includes a hull 221 having a stern 222 with a dynamic water line 201. A canopy 227 extending rearwardly from the stern 222 includes a downwardly facing surface 228 that depresses the powerboat rooster tail produced by a propulsion discharge 202, while port and starboard sides 227A and 227B of the canopy 227 extend downwardly from the downwardly facing surface 228 in positions to restrict lateral movement of the powerboat rooster tail. Unlike the powerboat 100, however, the powerboat 200 includes means for venting the powerboat rooster tail to port and starboard under user control to produce a net lateral thrust that enhances maneuverability. The port side 227A includes first means (i.e., first venting means) for venting the powerboat rooster tail to port to produce a net starboard-directed lateral thrust that facilitates turning the hull to port, and the starboard side 227B includes second means (i.e., second venting means) for venting the powerboat rooster tail to starboard to produce a net port-directed lateral thrust that facilitates turning the hull to starboard. The imbalance in the flow of the propulsion discharge that is created by venting the propulsion discharge to either port or starboard results in a net lateral thrust in the other direction, away from the side being vented.

The first and second venting means are similar and so only the second venting means is illustrated and described in further detail. The second venting means includes the starboard side 227B, along with a first opening 203 in the starboard side 227B (i.e., an opening defined by the starboard side 227B). The second venting means also includes a first panel 204 (i.e., a starboard panel) that is mounted movably on the canopy 227 so that it can be moved linearly under operator control between a NON-VENTED position of the first panel 204 in which it obstructs fluid flow laterally through the first opening 203 (i.e., it obstructs lateral flow of the propulsion discharge) and a VENTED position of the first panel 204 in which it allows significant lateral fluid flow through the first opening 203. The opening 203 is identified by a reference numeral and leadline in FIG. 12, and the linear movement of the first panel 204 is indicated by a double-headed arrow 207 next to the first panel 204 in both FIGS. 12 and 13.

The first panel 204 is any suitably rigid structure (e.g., a rigid sheet composed of a carbon fiber composite material) that is moved linearly (e.g., slid) between the VENTED and NON-VENTED positions. The VENTED position of the first panel 204 is shown in FIGS. 12 and 13 while a corresponding NON-VENTED position is suggested in FIGS. 12 and 13 for a similar panel on the port side 227A (a second panel or port panel that is similar to the first panel 204) A suitable control system 221A (shown diagrammatically as a block in FIG. 12 and FIGS. 13) is included on the powerboat 200 for mechanically moving the port and starboard panels linearly under operator control. The broken lines in FIG. 12 and FIG. 13 represent mechanical coupling of the control system 231A to the first panel 204.

Based upon the foregoing and subsequent descriptions, one of ordinary skill in the art can readily implement a canopy with venting means and associated control system that achieve the enhanced maneuverability desired. To turn the powerboat 200 sharply to starboard, the operator uses the control system to move just the first panel 204 to the VENTED position. When that is done, the propulsion discharge is free to flow through the first opening 203 as depicted by the flow-line arrows in FIG. 13, thereby resulting in a net lateral thrust to port. An arrowhead 205 in FIG. 13 indicates such a horizontally directed lateral thrust component, while an arrowhead 206 indicates the vertically directed lift component mentioned earlier. When the additional lateral thrust to port is no longer desired, the operator uses the control system to move the first panel 204 back to the NON-VENTED position. The structure and operation of the first venting means on the port side 227A is similar to that illustrated and described for the starboard side 227B, and so it is not illustrated and described in further detail.

Figure 14:
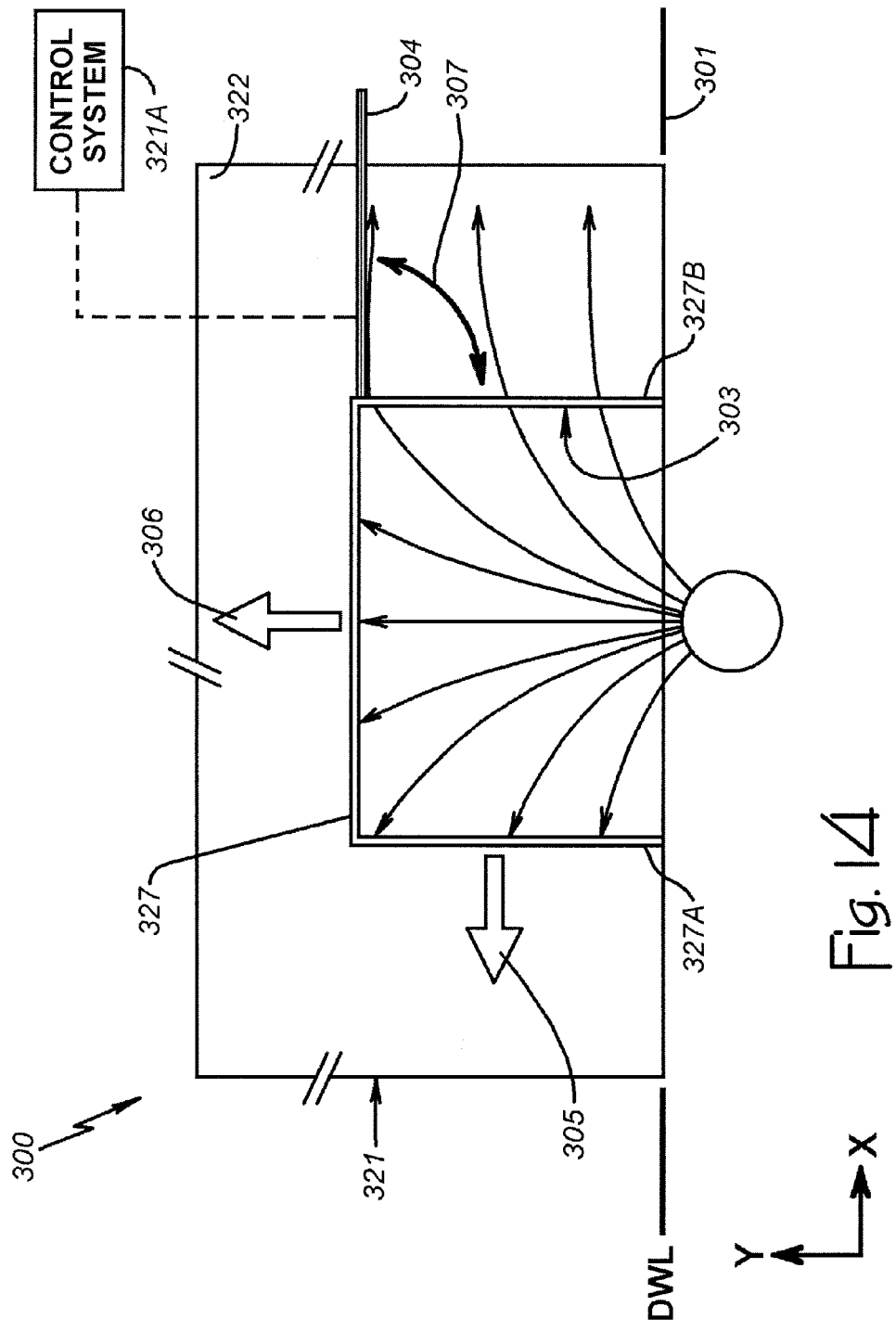

FIG. 14 illustrates another form of venting with reference to a powerboat 300. It is similar in many respects to the powerboat 200 described above, and so only major differences are described in further detail. For convenience, reference numerals designating parts of the powerboat 300 are increased by one hundred over the reference numbers designating corresponding, related, or similar parts of the powerboat 200.

Similar to the powerboat 200, the powerboat 300 includes a hull 321 having a stern 322 with a dynamic water line 301. A canopy 327 extending rearwardly from the stern 322 includes port and starboard sides 327A and 327B that extend downwardly in positions to restrict lateral movement of the powerboat rooster tail. In addition, the powerboat 300 includes means for venting the powerboat rooster tail to port and starboard under user control to produce a net lateral thrust that enhances maneuverability. The port side 327A includes first means (i.e., first venting means) for venting the powerboat rooster tail to port to produce a net starboard-directed lateral thrust that facilitates turning the hull to port, and the starboard side 327B includes second means (i.e., second venting means) for venting the powerboat rooster tail to starboard to produce a net port-directed lateral thrust that facilitates turning the hull to starboard.

The first and second venting means for the powerboat 300 are similar and so only the second venting means is illustrated and described in further detail. The second venting means includes the starboard side 327B, along with a first opening 303 in the starboard side 327B (i.e., an opening defined by the starboard side 327B). The second venting means also includes a first panel 304 (i.e., a starboard panel) that is mounted movably on the canopy 327 so that it can be moved pivotally under operator control between a NON-VENTED position of the first panel 304 in which it obstructs fluid flow laterally through the first opening 303 (i.e., it obstructs lateral flow of the propulsion discharge) and a VENTED position of the first panel 304 (the position shown in FIG. 14) in which it allows significant lateral fluid flow through the first opening 303. The opening 303 is identified by a reference numeral and leadline in FIG. 14, and the pivotal movement of the first panel 304 is indicated by double-headed arrows 307 next to the first panel 304. A suitable control system 321A (shown diagrammatically as a block in FIG. 14) is included on the powerboat 300 for mechanically moving the port and starboard panels pivotally under operator control.

Figure 15:
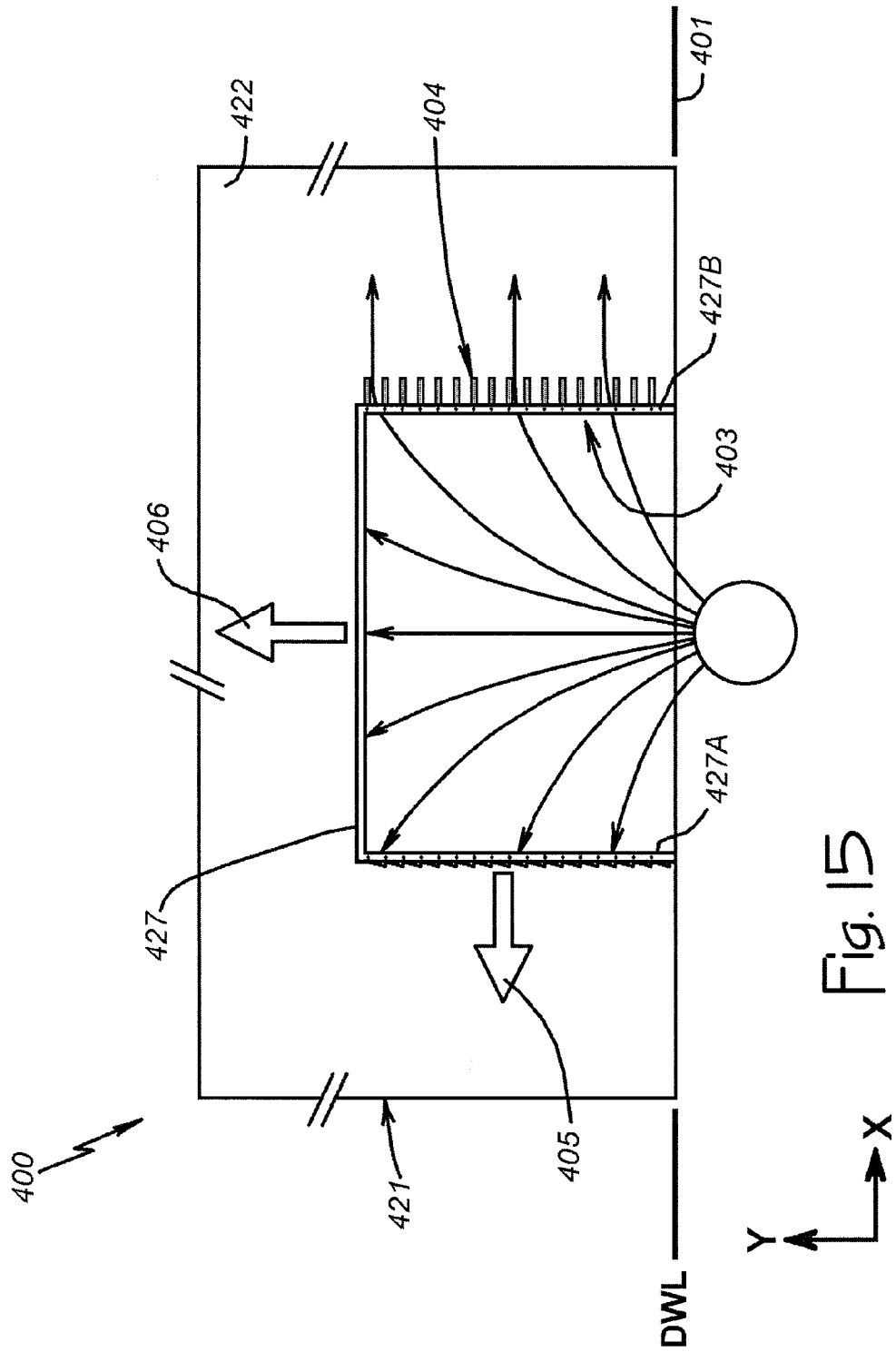

FIG. 15 illustrates still another form of venting with reference to a powerboat 400. It is similar in many respects to the powerboat 300 described above, and so only major differences are described in further detail. For convenience, reference numerals designating parts of the powerboat 400 are increased by one hundred over the reference numbers designating corresponding, related, or similar parts of the powerboat 300.

Similar to the powerboat 300, the powerboat 400 includes a hull 421 having a stern 422 with a dynamic water line 401. A canopy 427 extending rearwardly from the stern 422 includes port and starboard sides 427A and 427B that extend downwardly in positions to restrict lateral movement of the powerboat rooster tail. In addition, the powerboat 400 includes means for venting the powerboat rooster tail to port and starboard under user control to produce a net lateral thrust that enhances maneuverability. The port side 427A includes first means (i.e., first venting means) for venting the powerboat rooster tail to port to produce a net starboard-directed lateral thrust that facilitates turning the hull to port, and the starboard side 427B includes second means (i.e., second venting means) for venting the powerboat rooster tail to starboard to produce a net port-directed lateral thrust that facilitates turning the hull to starboard.

The first and second venting means for the powerboat 400 are also similar and so only the second venting means is illustrated and described in further detail. The second venting means includes the starboard side 427B, along with a first opening 403 in the starboard side 427B (i.e., an opening defined by the starboard side 427B). The second venting means also includes a first shutters component 404 (i.e., a starboard shutters) that is mounted movably on the canopy 427 so that it can be opened and closed under operator control between a NON-VENTED position of the first shutters component 404 in which it obstructs fluid flow laterally through the first opening 403 (i.e., it obstructs lateral flow of the propulsion discharge) and a VENTED position of the first shutters component 404 (the position shown in FIG. 15) in which it allows significant lateral fluid flow through the first opening 403. The first opening 403 is identified by a reference numeral and leadline in FIG. 15. A suitable control system 421A (shown diagrammatically as a block in FIG. 15) is included on the powerboat 400 for mechanically moving the port and starboard panels pivotally under operator control.

The first shutters component 404 is a known type of structure that includes multiple slats or shutters that move together as the first shutters component 404 moves between the VENTED position shown in FIG. 15 and the NON-VENTED position shown for the second venting means on the port side 427A of the canopy 427. One can visualize the shutter component as being something like an arrangement of moveable slats as may be found on an Aldis signal lamp shutters, or a Venetian blind type of window shade, or an exhaust fan shutters. Based upon the foregoing, one of ordinary skill can readily implement a shutters component type of venting means according to the invention.

Thus, the invention provides a powerboat having a rooster-tail-suppressing assembly that significantly reduces powerboat radar signature while improving powerboat efficiency and performance. Various versions provide the additional advantages described, including a ventable-canopy embodiment that enhances maneuverability. Although exemplary embodiments have been shown and described, one of ordinary skill in the art may make many changes, modifications, and substitutions without necessarily departing from the spirit and scope of the invention. As for the specific terminology used to describe the exemplary embodiments, it is not intended to limit the invention; each specific term is intended to include all technical equivalents that operate in a similar manner to accomplish a similar purpose or function, it being intended, for example, that the term "powerboat" includes any of various powered watercraft and seagoing vessels and that the term "powerboat rooster tail" includes any propulsion discharge rising above the dynamic water line at the stern.

What is claimed is:

1. A powerboat, comprising:
    a hull having a stern, said stern having a dynamic water line;

a propulsion subassembly on the hull that functions as means for propelling the hull through water with sufficient power to produce a powerboat rooster tail; and means for suppressing the powerboat rooster tail, including a rooster-tail-suppressing subassembly on the boat hull that extends rearwardly of the stern;

wherein the rooster-tail-suppressing subassembly includes a canopy having a downwardly facing surface extending rearwardly of the stern, said downwardly facing surface having an upper region that is disposed at least six inches above a horizontal reference plane containing the dynamic water line;

wherein the canopy has a port side and a starboard side such that the port side and the starboard side extend downwardly from the downwardly facing surface so that the port side and starboard sides obstruct lateral movement of the powerboat rooster tail;

wherein the port side includes first means for venting the powerboat rooster tail to port to produce a net starboard-directed lateral thrust that facilitates turning the hull to port; and wherein the starboard side includes second means for venting the powerboat rooster tail to starboard to produce a net port-directed lateral thrust that facilitates turning the hull to starboard.

2. A powerboat as recited in claim 1, wherein:

the port side defines a first opening for enabling passage of the powerboat rooster tail to port;

the starboard side defines a second opening for enabling passage of the powerboat rooster tail to starboard;

the first means for venting the powerboat rooster tail to port includes a first panel configured to be moved under operator control between a NON-VENTED position of the first panel in which the first panel obstructs passage of a portion of the powerboat rooster tail through the first opening and a VENTED position of the first panel in which the first panel facilitates passage of a portion of the powerboat rooster tail through the first opening; and the second means for venting the powerboat rooster tail to starboard includes a second panel configured to be moved under operator control between a NON-VENTED position of the second panel in which the second panel obstructs passage of a portion of the powerboat rooster tail through the second opening and a VENTED position of the second panel in which the second panel facilitates passage of a portion of the powerboat rooster tail through the second opening.

3. A powerboat as recited in claim 2, wherein the first and second panels are moveable vertically between the NON-VENTED and VENTED positions.

4. A powerboat as recited in claim 2, wherein the first and second panels are pivotable between the NON-VENTED and VENTED positions.

5. A powerboat as recited in claim 1, wherein:

the first means for venting the powerboat rooster tail to port includes a first shutters-type of venting arrangement as part of the port side of the canopy such that the first shutters-type venting arrangement is configured to be moved under operator control between a NON-VENTED position of the first shutters-type venting arrangement in which the first shutters-type venting arrangement obstructs passage of a portion of the powerboat rooster tail to port and an VENTED position of the first shutters-type venting arrangement in which the first shutters-type venting arrangement facilitates passage of a portion of the powerboat rooster tail to port; and the second means for venting the powerboat rooster tail to starboard includes a second shutters-type venting arrangement as part of the starboard side of the canopy such that the second shutters-type venting arrangement is configured to be moved under operator control between a NON-VENTED position of the second shutters-type venting arrangement in which the second shutters-type venting arrangement obstructs passage of a portion of the powerboat rooster tail to starboard and an VENTED position of the second shutters-type venting arrangement in which the second shutters-type venting arrangement facilitates passage of a portion of the power rooster tail to starboard.

* * * * *